United States Patent [19]

Kawamura

[11] Patent Number: 4,494,559
[45] Date of Patent: Jan. 22, 1985

[54] NEGATIVE PRESSURE CONTROL APPARATUS

[75] Inventor: Setuo Kawamura, Nagoya, Japan

[73] Assignees: Nippondenso Co., Ltd., Kariya; Toyota Jidosha Kabushiki Kaisha, Toyota, both of Japan

[21] Appl. No.: 464,136

[22] Filed: Feb. 7, 1983

[30] Foreign Application Priority Data

Feb. 10, 1982 [JP] Japan .............................. 57-17508[U]

[51] Int. Cl.$^3$ ............................................ G05D 16/06
[52] U.S. Cl. .................................. 137/116.5; 123/571; 137/627.5; 137/DIG. 8
[58] Field of Search ............... 123/571; 137/85, 116.5, 137/627.5, 596.17, DIG. 8

[56] References Cited

U.S. PATENT DOCUMENTS

| | | | |
|---|---|---|---|
| 3,071,147 | 1/1963 | Dudzinski | 137/116.5 |
| 3,545,472 | 12/1970 | Franz | 137/116.5 |
| 4,079,753 | 3/1978 | Popp | 137/627.5 |

*Primary Examiner*—Robert G. Nilson
*Attorney, Agent, or Firm*—Cushman, Darby & Cushman

[57] ABSTRACT

A negative pressure control apparatus for controlling an exhaust gas recirculation control valve for a diesel engine. The apparatus has a negative pressure chamber and an atmospheric pressure chamber with a diaphragm therebetween. The negative pressure chamber has an inlet port which is connected to a vacuum, and an outlet port which provides the controlled negative pressure. The atmospheric pressure chamber contains an electromagnet whose force is varied according to the load of the diesel engine. The diaphragm is fixed to a magnetic material and has a communication channel between the negative and atmospheric pressure chambers. A movable tubular body is inserted in the communication channel to provide communication between the negative pressure chamber and the inlet port. A valve plug is also inserted into the communication channel to provide communication between the negative and the atmospheric pressure chambers. The diaphragm deforms in accordance with the pressure differential in the two chambers and the magnetic attraction between the magnetic material fixed to the diaphragm and the electromagnet in the atmospheric pressure chamber. As the diaphragm deforms, the movable tubular body and the valve plug operate to provide alternate venting between the negative pressure chamber and the inlet port, and the negative and atmospheric pressure chambers. Thus, controlled negative pressure corresponding to the load on the diesel engine, is supplied at the outlet port. For controlling the output, an adjustment member is provided which allows external adjustment of the gap between the electromagnet and the diaphragm.

6 Claims, 5 Drawing Figures

NEGATIVE PRESSURE CONTROL APPARATUS

BACKGROUND OF THE INVENTION

The present invention relates to a negative pressure control apparatus for automatically changing a a negative pressure in accordance with a load of an engine and, more particularly, to a negative pressure control apparatus for controlling an exhaust gas recirculation control valve (to be referred to as an EGR control valve for brevity hereinafter) for a diesel engine.

Recently, measures to restrict exhaust gases have become necessary for diesel engines as well as for gasoline engines. An EGR control system, for example, is used for a diesel engine.

Unlike a gasoline engine, a diesel engine does not have a pressure source which can change pressure in accordance with the load of the engine. For this reason, an EGR control system for a diesel engine must have a separate pressure source so as to control the operation of an EGR control valve for the purpose of adjusting the flow rate of the exhaust gas. In view of this requirement, an EGR control system has been proposed which has as a pressure source a combination of a vacuum pump and a negative pressure control apparatus. Such a negative pressure control apparatus has a negative pressure chamber connected to the EGR control valve. The negative pressure in the negative pressure chamber must be changed in accordance with the load of the diesel engine. For this purpose, the negative pressure chamber of the apparatus is connected to a vacuum chamber in accordance with the load of the engine, so that the interior of the negative pressure chamber may be kept at a suitable negative pressure. In the negative pressure control apparatus of the type described above, the negative pressure in the negative pressure chamber must be controlled in a precise manner. The control apparatus must be assembled with high precision and must also be easy to assemble. The apparatus should preferably allow adjustment after assembly.

SUMMARY OF THE INVENTION

It is an object of the present invention to provide a negative pressure control apparatus which allows adjustment from outside after assembly and which also allows easy assembly.

In accordance with an aspect of the present invention, there is provided a negative pressure control apparatus comprising:

a first housing defining a negative pressure chamber therein;

an inlet port which is arranged at said first housing and is adapted to be coupled to a vacuum source;

an outlet port which is arranged at said first housing, communicates with said negative pressure chamber, and supplies a controlled negative pressure;

a second housing defining an atmospheric pressure chamber kept at the atmospheric pressure therein;

a diaphragm which is interposed between said atmospheric and negative pressure chambers and is adapted to deform in accordance with a difference between the atmospheric and negative pressures in said atmospheric and negative pressure chambers;

a valve case of a magnetic material, which defines therein a communication channel for communicating said atmospheric and negative pressure chambers having a valve hole opening to said atmospheric pressure chamber and is supported by said diaphragm;

a tubular body which defines therein a negative pressure channel communicating with said inlet port, is inserted in said communication channel of said valve case, is supported to be movable along said communication channel, and has an opening open to said communication channel of said valve case;

a valve plug adapted to open/close said opening of said tubular body and said valve hole of said valve case;

means, urging said valve plug to said valve case and to said tubular body, for closing at least one of said opening of said tubular body and said valve hole of said valve case;

an electromagnet which is arranged inside said second housing and which attracts said valve case together with said valve plug closing said valve hole of said valve case so as to open said opening of said tubular body and to communicate said inlet port to said negative pressure chamber through said negative pressure and communication channels, at which time the negative pressure in said negative pressure chamber is decreased to cause said diaphragm to deform toward said negative pressure chamber, deformation of said negative pressure chamber causing said valve case to move so that said opening of said tubular body is closed again by said valve plug and said valve hole of said valve case is opened, thereby communicating said negative pressure chamber with said atmospheric pressure chamber through said communication channel so as to increase the negative pressure in said negative pressure chamber and to deform said diaphragm toward said atmospheric pressure chamber; and adjusting means for moving said tubular body so as to control the movement of said valve case which is caused by deformation of said diaphragm and attraction of said electromagnet.

DETAILED DESCRIPTION OF THE PREFERRED EMBODIMENT

Figure 1:
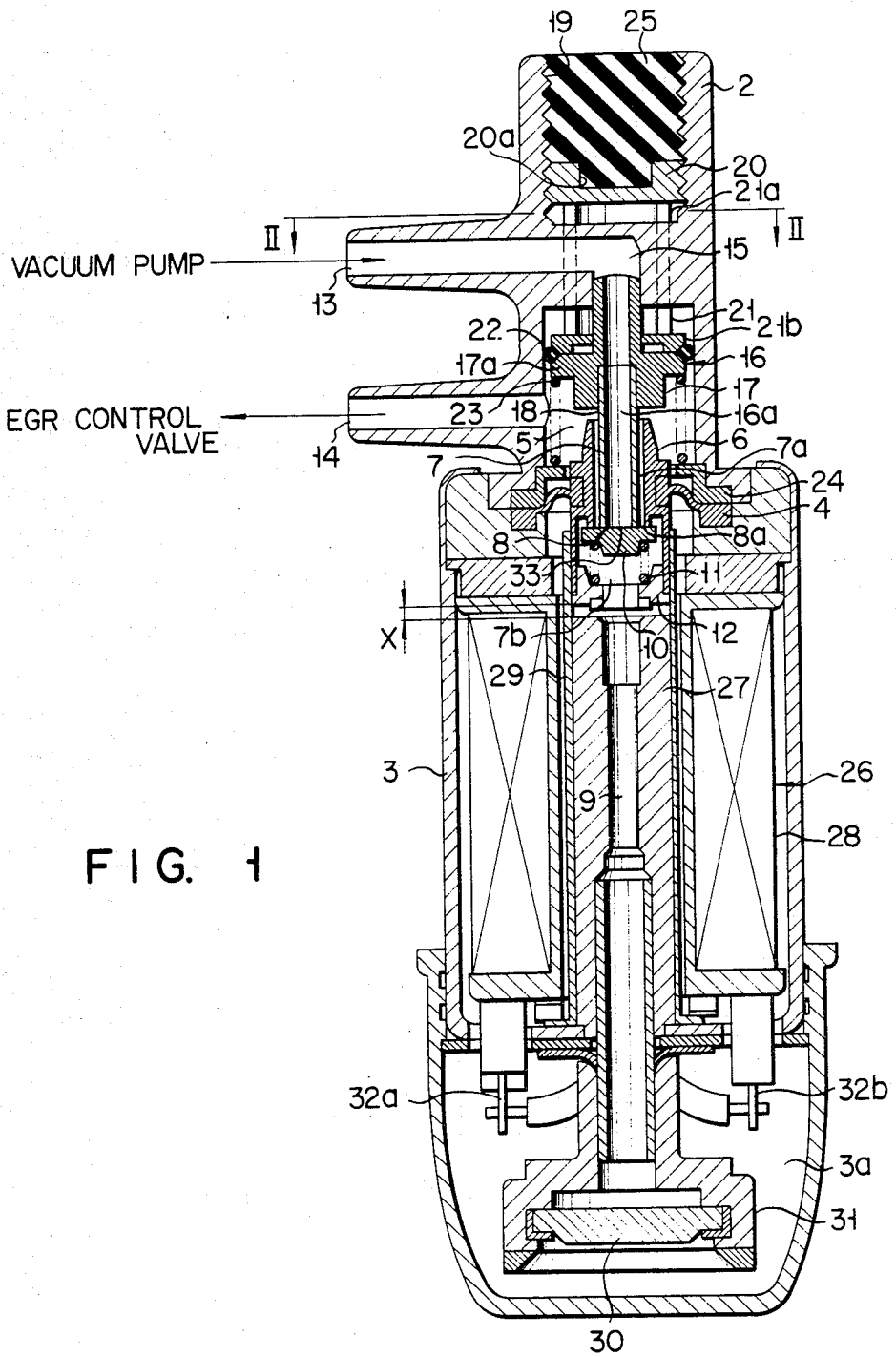
FIG. 1 is a longitudinal sectional view of a negative pressure control apparatus according to an embodiment of the present invention.

FIG. 1 shows a negative pressure control apparatus controlling an EGR control valve of a diesel engine, in accordance with an embodiment of the present invention.

The negative pressure control apparatus has a main body 1 including an upper housing 2 and a lower housing 3. A diaphragm 4 separates the upper and lower housings 2 and 3, thereby defining a negative pressure chamber 5 in the upper housing 2 and also defining a first atmospheric pressure chamber 3a in the lower housing 3. A subtantially cylindrical valve case 6 of a magnetic material is fixed to the diaphragm 4 to extend at the center thereof. A communication channel 7 extends along the central axis of the valve case 6. The communication channel 7 has a narrow portion 7a and a wide portion 7b as a second atmospheric pressure chamber, defining a valve hole 8 therebetween. The narrow portion 7a of the communication channel 7 communicates with the negative pressure chamber 5, while the wide portion 7b communicates with an atmospheric pressure channel 9. The wide portion 7b of the communication channel 7 houses a valve plug 10 and a valve spring 11 therein. The valve spring 11 is interposed between the valve plug 10 and a spring holder 12 fixed to the valve case 6. The valve spring 11 serves to urge the valve plug 10 toward a valve seat 8a so as to close the valve hole 8.

The upper housing 2 has an inlet port 13 and an outlet port 14 which both communicate with the negative pressure chamber 5. The inlet port 13 is connected to a vacuum pump (not shown). The outlet port 14 is connected to an EGR control valve (not shown) for controlling the flow rate of exhaust gas in the EGR control system of a diesel engine.

The inlet port 13 communicates with a negative pressure channel 16a in a movable tubular body 16 through an inlet port channel 15 defined within the upper housing 2. The movable tubular body 16 comprises an upper pipe 17 and a lower pipe 18. The upper and lower pipes 17 and 18 are sealed air-tight to define the negative pressure channel 16a. The upper end of the movable tubular body 16, that is, the upper end of the upper pipe 17, is slidably and air-tightly fitted to the inlet port channel 15 communicating with the inlet port 13. The lower pipe 18 of the movable tubular body 16 is inserted within the communication channel 7 of the valve case 6. The lower end of the lower pipe 18 is air-tightly abutted to the valve plug 10 at the valve hole 8 in the non-operative state.

Figure 2:
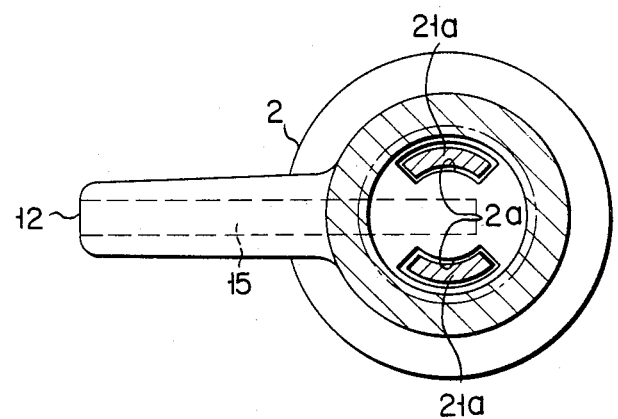
FIG. 2 is a sectional view along the line II—II in FIG. 1.
Figure 3:
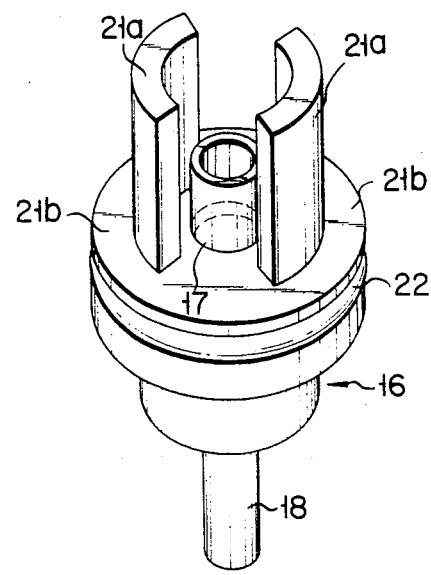
FIG. 3 is a perspective view showing the state wherein an intermediate member is assembled with a movable tubular body.

A screw hole 19 is formed at the upper portion of the upper housing 2. An adjustment screw 20 is screwed in the screw hole 19. A rectangular hole 20a for allowing rotation of the adjustment screw 20 is formed in the top surface of the adjustment screw 20. An intermediate member 21, as shown in FIGS. 2 and 3, is interposed between the adjustment screw 20 and the movable tubular body 16. The upper end of the intermediate member 21 abuts against the bottom surface of the adjustment screw 20, while the lower end of the intermediate member 21 abuts against a flange 17a of the movable tubular body 16. As shown in FIG. 3, a pair of projections 21a protrude from the top surface of the intermediate member 21. As shown in FIG. 2, the projections 21a are inserted into a pair of guide holes 2a formed in the upper housing 2, so that the upper ends thereof may abut against the bottom surface of the adjustment screw 20. In this case, the valve case 6, the valve plug 10, the movable tubular body 16, the intermediate member 21 and the adjustment screw 20 are substantially arranged on the central axis of the upper housing 2. An O-ring 22 is provided on a main body 21b of the intermediate member 21. The O-ring 22 contacts the inner surface of the negative pressure chamber 5 housing the main body 21b of the intermediate member 21, such that the O-ring 22 is kept air-tight and is slidable. The negative pressure chamber 5 is thus kept air-tight. An adjustment spring 23 is housed in the negative pressure chamber 5. The adjustment spring 23 is interposed between a spring seat 24 in the negative pressure chamber 5 and the flange 17a of the movable tubular body 16 so as to bias or urge the movable tubular body 16 and the intermediate member 21 toward the adjustment screw 20. In practice, the O-ring 22 is clamped between the main body 21b of the intermediate member 21 and the flange 17a of the movable tubular body 16. The O-ring 22 is deformed by the biasing force of the adjustment spring 23 and provides an air-tight seal of the negative pressure chamber 5. The screw hole 19 receiving the adjustment screw 20 is closed with a silicon sealing member 25 after assembly of the apparatus.

An electromagnet 26 which is received in the lower housing 3 and comprised of an iron core 27 and a coil 28 is arranged substantially on the central axis of the upper housing 2. The electromagnet 26 serves to attract the valve case 6 of a magnetic material along its axial direction. A guide cylinder 29 is inserted between the iron core 27 and the coil 28. The lower portion of the valve case 6 is slidably inserted at the upper end portion of the guide cylinder 29. The atmospheric pressure channel 9 described before is defined inside the iron core 27. The atmospheric pressure channel 9 communicates with the first atmospheric pressure chamber 3a defined in the lower housing 3 through an air filter 30. The air filter 30 is held by a filter holder 31. The electromagnet 26 has terminals 32a and 32b which receive a load signal having a level which changes in accordance with the load of the diesel engine.

The mode of operation of the negative pressure control apparatus of the construction as described above will now be described.

Figure 4:
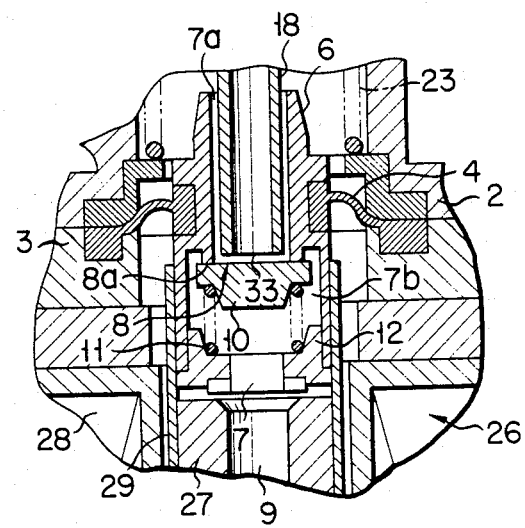
FIG. 4 is an enlarged partial view of FIG. 1 in which the inner open end of the movable tubular body is opened.
Figure 5:
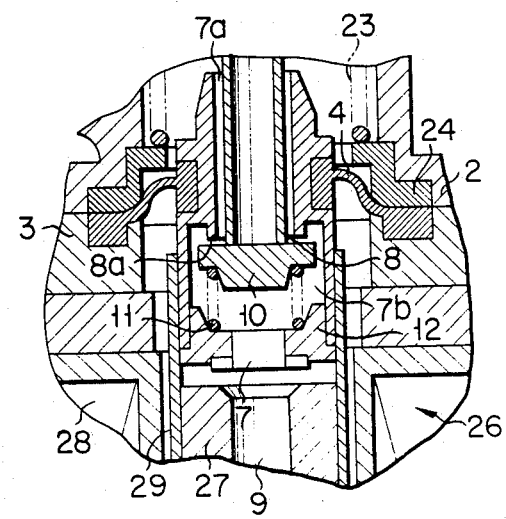
FIG. 5 is an enlarged partial view of FIG. 1 in which the valve hole of the valve case is opened.

When a load signal of a level corresponding to the load of the engine is supplied to the electromagnet 26 in the condition shown in FIG. 1, the electromagnet 26 is excited to attract the valve case 6 downward against the supporting force of the diaphragm 4. When the electromagnet 26 attracts the valve case 6, the diaphragm 4 is deformed. As shown in FIG. 4, the valve case 6 is moved downward along the guide cylinder 29, and the valve plug 10 which has been closing the valve hole 8 of the valve case 6 is moved downward by the valve case 6 while it is in contact with the valve seat 8a. The movable tubular body 16 is biased upward by the adjustment spring 23; it remains in position even if the valve case 6 and the valve plug 10 move, since the movable tubular body 16 is suspended by the upper housing 2. Then, the lower end opening of the movable tubular body 16 which has been closed by abutment with the valve plug 10 is opened. The negative pressure channel 16a of the movable tubular body 16 communicates with the narrow portion 7a of the communication channel 7 in the valve case 6, thereby communicating the inlet port 13 with the negative pressure chamber 5. When the inlet port 13 communicates with the negative pressure chamber 5, the negative pressure chamber 5 is exhausted by the vacuum pump connected to the inlet port 13, so that the negative pressure therein is reduced. When the negative pressure in the negative pressure chamber 5 overcomes the attraction force of the electromagnet 26 acting on the valve case 6, the valve case 6 is raised by the diaphragm 4 against the attraction force of the electromagnet 26. Then, as shown in FIG. 1, the valve plug 10 in the valve case 6 abuts against the lower end of the movable tubular body 16 to close its lower end opening 33, thereby forming a seal between the inlet port 13 and the negative pressure chamber 5. After the valve plug 10 abuts against the lower end of the movable tubular body 16 as shown in FIG. 1, the upward movement of the valve plug 10 is prevented. However, the valve case 6 is attracted upward by the negative pressure in the negative pressure chamber 5 against the attraction force of the electromagnet 26. Then, as shown in FIG. 5, the valve plug 10 is separated from the valve seat 8a to open the valve hole 8 and to communicate the narrow and wide portions, 7a and 7b respectively of the communication channel 7. As a result, the negative pressure chamber 5 communicates with the atmospheric pressure channel 9 to introduce air into the negative pressure chamber 5 from the atmospheric pressure chamber 3a through the air filter 30, the atmospheric pressure channel 9 and the communication channel 7 of the valve case 6. In this manner, the internal pressure in the negative pressure chamber 5 is raised toward atmospheric pressure. With an increase in the internal pressure in the negative pressure chamber 5 toward the atmospheric pressure, the diaphragm 4 deforms in the inverse direction, and the valve case 6 is moved downward by the attraction force of the electromagnet 26 against the negative pressure in the negative pressure chamber 5. When the valve case 6 moves downward, the negative pressure control apparatus is restored to the state shown in FIG. 1 wherein the valve plug 10 of the valve case 6 abuts against the valve seat 8a to close the valve hole 8 and communication between the negative pressure chamber 5 and the atmospheric pressure channel 9 is interrupted. By repeating the above-mentioned operation, the valve case 6 oscillates vertically by being supported by the diaphragm 4. By the vertical oscillation of the valve case 6, the negative pressure in the negative pressure chamber 5 is changed in accordance with the level of the load signal which is supplied to the electromagnet 26. The negative pressure in the negative pressure chamber 5 which changes with time is supplied to the EGR control valve described above through the outlet port 14 of the upper housing 2. In the negative pressure control apparatus which operates in the manner as described above, the level of a load signal supplied to the electromagnet 26 is determined as a function of the load of a diesel engine involved, and a negative pressure corresponding to this load is supplied to the EGR control valve from the negative pressure chamber 5 through the outlet port 14. Accordingly, a pressure source for a diesel engine is obtained in which the pressure is changed in accordance with the load of the engine, thus allowing EGR control of the diesel engine.

In the negative pressure control apparatus of the embodiment described above, during a performance test after assembly, a gap X between the valve case 6 and the electromagnet 26 shown in FIG. 1 can be adjusted from the outside. If it is desired to decrease the gap X between the valve case 6 and the electromagnet 26, the adjustment screw 20 screwed in the screw hole 19 of the upper housing 2 is rotated to move it downward. Then, the valve plug 10 of the valve case 6 is moved downward through the intermediate member 21 and the movable tubular body 16 against the biasing force of the adjustment spring 23. This movement of the valve plug 10 results in downward movement of the valve case 6 so that the gap X between the valve case 6 and the electromagnet 26 is adjusted to a suitable value. If it is desired to increase the gap X between the valve case 6 and the electromagnet 26, the adjustment screw 20 is screwed upward once within the screw hole 19 to move the valve case 6 upward by the biasing force of the adjustment spring 23. In other words, the valve case 6 is moved upward once to provide a big gap X between the valve case 6 and the electromagnet 26. Then, the above-mentioned operation is performed to adjust the gap X.

As may be seen from the adjustment operation as described above, the assembly of the negative pressure control apparatus of the present invention does not require measurement of the gap X between the valve case 6 and the electromagnet 26 with a gauge or the like nor does it require a temporary assembly to allow subsequent adjustment of the gap X to a suitable predetermined value. The negative pressure control apparatus of the present invention can be assembled in a simple manner and within a short period of time. After assembly of the apparatus, the gap X between the valve case 6 and the electromagnet 26 may be adjusted for each apparatus, so that each apparatus may operate with excellent reliability and high precision.

What is claimed is:

1. A negative pressure control apparatus comprising:
 a first housing defining a negative pressure chamber therein;
 an inlet port which is arranged at said first housing and is adapted to be coupled to a vacuum source;
 an outlet port which is arranged at said first housing, communicates with said negative pressure chamber, and supplies a controlled negative pressure;
 a second housing defining an atmospheric pressure chamber kept at the atmospheric pressure therein;
 a diaphragm which is interposed between said atmospheric and negative pressure chambers and is adapted to deform in accordance with a difference between the atmospheric and negative pressures in said atmospheric and negative pressure chambers;
 a valve case of a magnetic material, which defines therein a communication channel for communicating said atmospheric and negative pressure chambers having a valve hole opening to said atmospheric pressure chamber and is supported by said diaphragm;
 a tubular body which defines therein a negative pressure channel communicating with said inlet port, is inserted in said communication channel of said valve case, is supported to be movable along said communication channel, and has an opening open to said communication channel of said valve case;
 a valve plug which is adapted to open/close said opening of said tubular body and said valve hole of said valve case;
 means, urging said valve plug to said valve case and to said tubular body, for closing at least one of said opening of said tubular body and said valve hole of said valve case;
 an electromagnet which is arranged inside said second housing and which attracts said valve case together with said valve plug which has closed said valve hole of said valve case so as to open said opening of said tubular body and to communicate said inlet port with said negative pressure chamber through said negative pressure and communication channel, at which time the negative pressure in said negative pressure chamber is decreased to cause said diaphragm to deform toward said negative pressure chamber causing said valve case to move so that said opening of said tubular body is closed again by said valve plug and said valve hole of said valve case is opened, thereby communicating said negative pressure chamber with said atmospheric pressure chamber through said communication channel so as to increase the negative pressure in said negative pressure chamber and to deform said diaphragm toward said atmospheric pressure chamber; and adjusting means for moving said tubular body so as to control the movement of said valve case which is caused by deformation of said diaphragm and attraction of said electromagnet.

2. An apparatus according to claim 1, wherein said first housing has a recess with internal threads; and said adjusting means has an adjustment member engaging with said threads of said recess, an intermediate member interposed between said adjustment member and said tubular body, and means for urging said tubular body to said adjustment member through said intermediate member, said tubular body being moved against said urging means upon rotation of said adjustment member.

3. An apparatus according to claim 2, wherein said intermediate member is arranged air-tightly in said negative pressure chamber so as to be slidable therein.

4. An apparatus according to claim 3, wherein a central axis of said electromagnet coincides with the central axis of said first housing.

5. An apparatus according to claim 2, wherein said valve case, said valve plug, said tubular body, said intermediate member and said adjustment member are arranged on a substantially central axis of said first housing and are movable therealong.

6. An apparatus according to claim 1, wherein said valve case is slidably supported in said atmospheric pressure chamber.

* * * * *